United States Patent [19]
Zurawski

[11] Patent Number: 4,872,214
[45] Date of Patent: Oct. 3, 1989

[54] METHOD AND APPARATUS FOR HIGH PERFORMANCE DIVISION

[75] Inventor: John H. Zurawski, Stow, Mass.

[73] Assignee: Digital Equipment Corporation, Maynard, Mass.

[21] Appl. No.: 176,787

[22] Filed: Apr. 1, 1988

[51] Int. Cl.$^4$ ............................................... G06F 7/52
[52] U.S. Cl. .................................................. 364/766
[58] Field of Search ................ 364/761, 764, 766, 767

[56] References Cited

PUBLICATIONS

Zurawski et al., "Design of High-Speed Digital Divider Units", IEEE Trans. on Computer, vol. C-30, No. 9, Sep. 1981, pp. 691–699.

Markin, "Implementation of Division Algorithm Halves Iteration Time", Computer Design, Jul. 1979, pp. 129–134.

Zurawski et al., "Floating Point in the VAX 8800 Family," Digital Technical Journal, No. 4, Feb. 1987, pp. 62–71.

Primary Examiner—Gary V. Harkcom
Assistant Examiner—Tan V. Mai

[57] ABSTRACT

An apparatus and method for performing high performance division by implementing a sliced design configuration wherein at least several of the most significant bits of the dividend are located in a master slice and the remaining bits of the dividend are located in at least one slave slice. Although data to be passed from the slave slices to the master slice trails the master slice's data by two cycles, the master can still determine its next operation by uniquely employing a redundant division algorithm.

5 Claims, 2 Drawing Sheets

METHOD AND APPARATUS FOR HIGH PERFORMANCE DIVISION

FIELD OF THE INVENTION

This invention relates to arithmetic logic hardware of a digital computer. Specifically, it relates to bit-slice division performed by arithmetic logic hardware of digital computers.

BACKGROUND OF THE INVENTION

Division, in binary arithmetic, is generally accomplished by successive shift and subtract operations. The number to be divided is known as the dividend (DD), while the number by which the DD is divided is known as the divisor (DR). Binary division is simpler than decimal division because there is no need to estimate how many times the DR fits into the DD or the partial remainder (PR) since binary digits (bits) can assume only the values "zero" or "one."

There are several techniques for performing binary division—these include both sliced and non-sliced designs. In a typical non-sliced design, division is accomplished as follows: an n-bit DR is compared to the most significant n bits of an m-bit DD, where $n \leq m$. If the most significant n bits of the DD represent a number smaller than the number represented by the n-bit DR, a "zero" is deposited in the quotient register (Q-register) in the bit position corresponding to the (n−1)th bit from the left most (most significant) bit (MSB) and the DD is shifted, relative to the DR, one bit position to the left. Again, a comparison is made. This time, however, the n-bit DR is compared to the most significant n+1 bits of the m-bit DD. Should the DR again be smaller, a "zero" w-11 be deposited in the Q-register bit position immediately to the right of the last deposited bit therein.

However, should the DR be greater than or equal to the number to which it is being compared, the DR is subtracted from the portion of the DD in question leaving what is referred to as a partial remainder (PR). Moreover, a "one" is deposited in the Q-register immediately to the right of the last deposited bit.

This process is repeated with the DR being compared to the PR. If the PR is greater than or equal to the DR, the bit deposited in Q-register is a "one" and a new PR is computed from the subtraction of the DR from the old PR; else, no subtraction is done and a "zero" is deposited in the Q-register. In either case, the PR is left-shifted to become the new PR. Each repetition is known as an "iteration". At the end of any iteration, the results of the division to that point in time can be found in Q-register with the remainder in PR. The process may continue until each bit in Q-register has been deposited with a "one" or "zero."

The process just described is known as the "comparison" method of binary division. Another method of binary division is known as the "non-restoring" method. In the non-restoring method, the DR is subtracted from the DD/PR regardless of the relative magnitude of DR and DD/PR. Should the result of the subtraction be greater than or equal to zero, a "one" is deposited in the Q-register. However, should the subtraction yield a result less than zero, a "zero" is deposited in Q-register and the next iteration of the division will perform the addition of the DR to the DD/PR. In either event, after each subtraction or addition, the DD/PR is shifted one bit to the left.

The binary division techniques referenced above, as well as others, can be implemented in a "bit-sliced" fashion.

In a bit-sliced design configuration, at least several of the most significant bits of the DD are located in a "master" slice while the remaining bits are parsed among one or more "slave" slices. Each individual slice takes the form of an individual divider as described above. Bit-sliced divider designs are sometimes preferred over non-sliced binary division schemes.

In bit-sliced binary division, each iteration of the division process is parsed into the iterations of the separate slices. That is, a given iteration of a non-sliced divider is equivalent to a combination of the separate iterations of the several individual slices. Moreover, the completion of the current master slice iteration triggers the current iteration of the slave slices. The master slice will not perform its next iteration until all the slave slices finish their current iteration.

The problem with bit-sliced binary division is that the master slice must communicate with each slave slice so as to inform each slave slice whether to perform a subtraction or addition with its "slice" of the DD and the DR. That is, no slave slice can function until after the master slice performs its task of either adding or subtracting the DR. Moreover, since in sliced-designs the master slice requires data from a slave slice, as described below, the master slice must wait until the slave slice is finished processing and ready to return the required data. At best, this introduces a two processing cycle delay in each iterative step in the division process.

SUMMARY OF THE INVENTION

Therefore, it is an object of the present invention to accomplish bit-sliced division in a way that avoids the performance reducing delays associated with prior art bit-sliced dividers.

The invention eliminates undesirable interslice time delays associated with prior art binary dividers by providing a master slice with a redundant division algorithm such that the master can process division iterations without waiting for information from a slave slice thus allowing the slaves to operate one cycle behind the master. Although the master slice operates without the benefit of complete information from the slaves, the provided redundant algorithm allows for a recovery of such information during a subsequent divisional iteration of the master slice.

DETAILED DESCRIPTION

Figure 1:
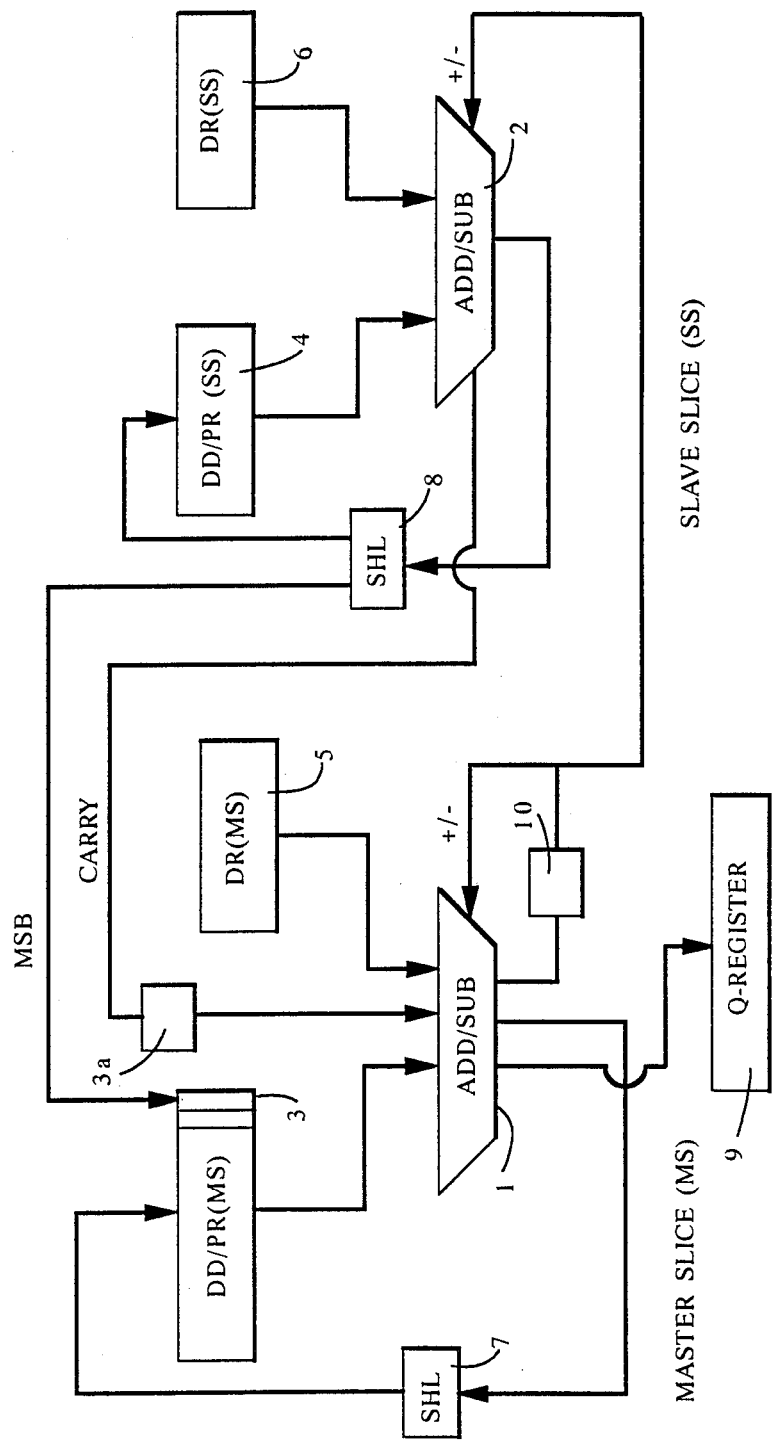
FIG. 1 illustrates a prior art bit-sliced divider.

FIG. 1 depicts a prior art bit sliced non-restoring divider. It consists essentially of two individual divider circuits. However, the two individual slices are interconnected in three ways. First, the sign bit from the master slices's adder/subtractor 1 is supplied through a register 10, to the slave slices's adder/subtractor 2 to indicate what operation is to be performed. If the sign bit indicates a master partial remainder less than or equal to zero, the slave adder/subtractor 2 should perform an addition; if, however, the sign bit indicates a master partial remainder greater than zero, the slave adder/subtractor 2 should perform a subtraction. Second, the most significant bit (MSB) of the slave slice's partial remainder is extracted from the slave's shift-left mechanism 8, (although the bit could be extracted from the adder/subtractor 2 prior to shifting) and loaded into the least significant bit (LSB) location of the master's DD/PR-Register 3. Although the slave's shift-left mechanism is shown as a box, this is typically accomplished by hard wiring the adder/subtractor 2 to the master's DD/PR-Register 3 such that the bits are left-shifted. Third, any carry-out bit from the slave's adder/subtractor 2 is loaded into a separate register $3a$ whose bit position corresponds to the LSB +1 position of the master's DD/PR-Register 3. The carry-out bit and the LSB +1 bit are added in the adder/subtractor 1.

In the prior art circuit of FIG. 1, the more significant half of the DD bits is loaded into the Master's DD/PR-Register 3 while the less significant half of the DD bits is loaded into the slave's DD/PR-Register 4. Similarly, the more significant half of the DR bits is loaded into the master's DR-Register 5 while half of the DR bits is loaded into the slave's DR-Register 6.

In operation, the master slice of the prior art divider performs left-shifts after each addition/subtraction operation by the adder/subtractor 1. Because of such left-shifts, the least significant bit is always loaded with a "zero." It is not until the slave slice passes its MSB and any carry bit to the master that the master DD/PR data is complete and ready for the next master iteration. The MSB of the slave slice is loaded into the LSB of the master's DD/PR Register 3. The reason for loading the MSB of the slave slice into the master's DD/PR-Register 3 is that the slave also executes a left-shift which logically requires that the bit be placed in the LSB of DD/PR-Register 3. Furthermore, the carry bit from the slave slice is loaded into the master's carry bit register $3a$ and added to the LSB +1 position of the DD/PR data by the adder/subtractor 1. Unfortunately, the master's waiting for the slave slice to complete its iteration and send data to the master creates a delay which reduces the performance of the prior art divider.

To overcome this reduction in performance, the present invention provides a master slice which does not wait for slave slices to complete their iterations before proceeding with the next master iteration. Rather, the master slice proceeds with a given iteration before slave slices complete their processing and furnish the master with an MSB and carry-out bit.

Figure 2:
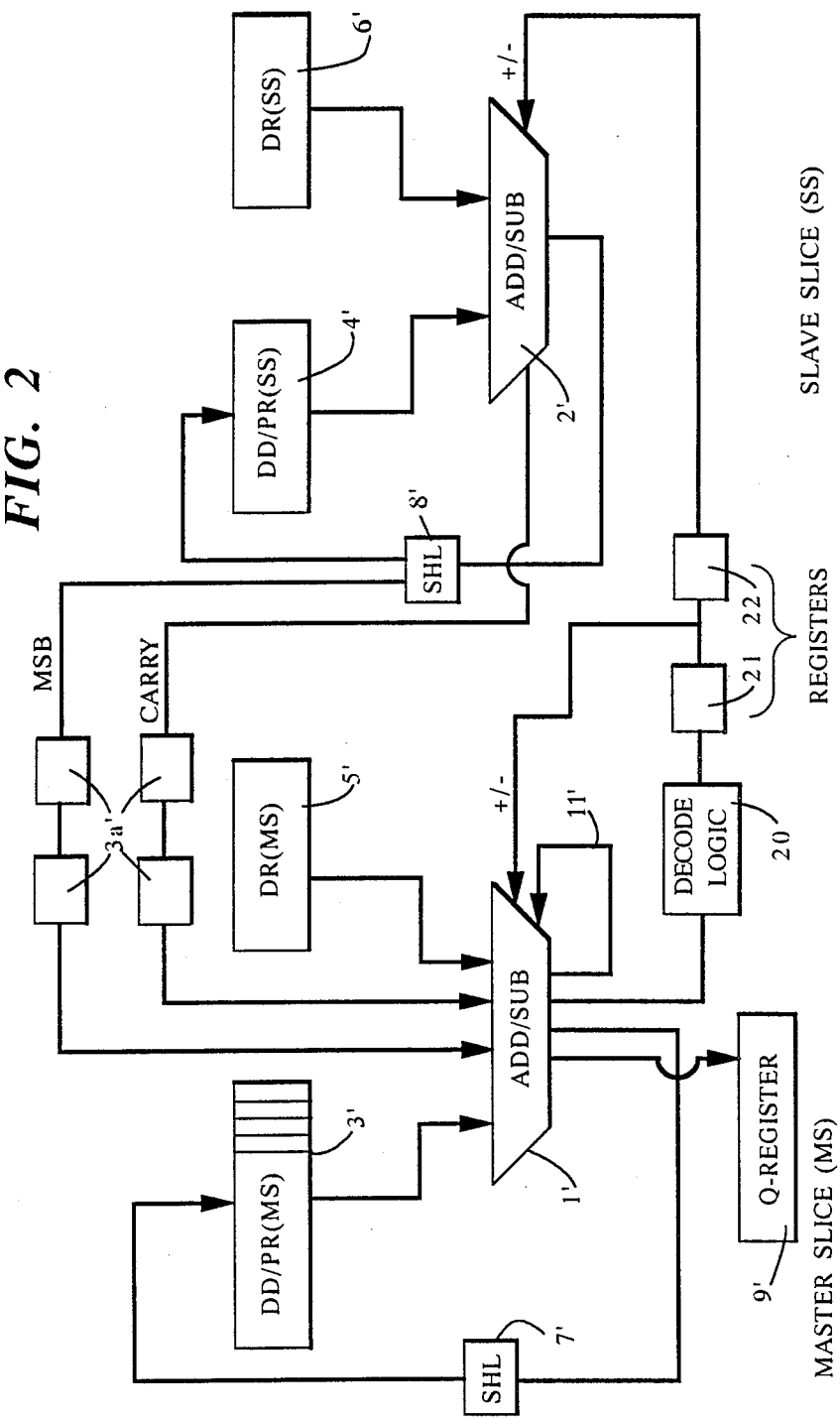
FIG. 2 illustrates a two-slice divider in accordance with the present invention.

FIG. 2 depicts the present invention configured in a two slice (one master, one slave) format. As with the prior art bit-sliced divider of FIG. 1, the master and slave slice DD/PR-Registers 3', 4' are loaded with the upper and lower halves of the DD, respectively.

Furthermore, the master and slave DR-Registers 5', 6' are loaded with the upper and lower halves of the DR, respectively. The result of the master slice's iteration is stored in the master slice's Q-Register 9'.

As referenced previously, the master slice of the present invention operates without regard to whether an MSB or carry bit has been passed from the slave slice. The removal of this interdependency allows the whole divider to operate without the delays inherent in the prior art systems. Specifically, for the two slice embodiment of FIG. 2, the delay which a prior art master slice must endure while a prior art slave completes its processing is eliminated. The present invention can result in substantial time savings over such a two slice prior art system.

However, because the master slice in the present invention does not wait for information from the slave slice, the present invention also provides for a modified slice interconnection at the master slice's MSB and carry bit registers $3a'$ and adder/subtractor $1'$ and a redundant division technique employed by the master slice.

The master-slave interconnection takes into account the fact that the master proceeds with iterations and does not wait for the slave to "catch-up" to the iteration of the master. As such, the master unit's left-shifting mechanism $7'$ will initially operate on master PRs twice in the present invention as compared to once for the prior art. Thereafter, they will both continue shifting each cycle and the slave will always be one cycle behind the master. Therefore, the left-shifted MSB from the slave slice is not placed in the LSB location of the DD/PR-Register $3'$ of the master as in the prior art. Rather, the MSB from the slave slice is added to the LSB+2 location of the DD/PR data by the adder/subtractor $1'$ via Registers $3a'$ reflecting the master unit's additional left shift of the PR data, as compared generally to the slave unit's PR data and specifically to the MSB of the slave's PR data. Additionally, any carry-out from the slave slice is added, not to the LSB+1 position of the master's DD/PR data, as in the prior art, but rather to the LSB+3 position of the master's DD/PR data by the adder/subtractor $1'$ via Register $3a'$.

In addition to this change in master-slave interconnection over the prior art, the present invention also provides a redundant division scheme for use by the master slice. This redundant scheme is implemented in a decoder 20 to account for the fact that in any prior iterative step the master slice was operating with incomplete data which was not made complete until the subsequent iteration when an MSB and carry bit were received from the slave. Thus, the subsequent iteration must be able to "recover" from any errors incurred as a result of the master slice's proceeding without having yet received an MSB or carry bit from its slave slice.

There are many redundant division schemes known in the prior art and any could be employed in the present invention.

One particular redundant scheme involves the comparison of the magnitude of the result of any given addition/subtraction ($1'$) of the master slice. If the result of any such addition/subtraction in an iteration is designated as "r", then this scheme indicates that if $$|r| < \tfrac{1}{4}, \text{ (i.e. } 2^{-2}),$$

the next iteration should involve only a shift by the master's left-shifter ($7'$) (no addition or subtraction performed). An addition/subtraction will be inhibited during the next master iteration by utilization of a feed back of the magnitude of the result of an iteration's addition or subtraction to the adder/subtractor on line $11'$ to by-pass an addition or subtraction operation of a subsequent iteration. Alternatively, addition/subtraction can be inhibited, in effect, by the performance of the addition/subtraction of zero.

The width of the master slice should be equal to at least the width of the redundancy region plus 2 bits to allow for the 2 cycle delay of the slave slices.

What is claimed is:

1. A bit-slice apparatus for performing division, which apparatus comprises:

(a) a master divider for dividing a master slice of a dividend by a master slice of divisor through a first series of iterations to obtain a master slice partial remainder after each one iteration of the first series of iterations, said master slice including a preselected number of most significant bits of the dividend;

(b) said master divider including a first partial remainder register having bit locations to store a cumulative master slice partial remainder;

(c) a slave divider for dividing a slave slice of the dividend by a slave slice of the divisor through a second series of iterations to obtain a slave slice partial remainder after each one iteration of the second series of iterations, said slave slice including the remaining bits of the dividend;

(d) said slave divider including a second partial remainder register having bit locations to store a cumulative slave slice partial remainder;

(e) a first line coupling a most significant bit location of the slave slice partial remainder register to a bit location in a register corresponding to an LSB+2 location of the master slice first partial remainder register;

(f) a second line coupling a carry-out bit of the slave divider to a bit location in said register corresponding to an LSB+3 location of the master slice first partial remainder register; and (g) a monitor for monitoring each one iteration of the first series of iterations of the master divider to detect a preselected condition and for inhibiting a subsequent iteration when said preselected condition is detected.

2. The apparatus of claim 1, wherein said monitor includes a feedback line to feedback the partial remainder of said one iteration to the master divider to by-pass a subsequent iteration when said preselected condition is detected.

3. The apparatus of claim 2 wherein said preselected condition is detected by the monitor when the monitor executes the redundant division scheme and determines that an absolute value of a partial remainder of a one iteration is less than $\frac{1}{4}$.

4. The apparatus of claim 1 wherein said preselected condition is determined by an operation of the monitor to execute a redundant division scheme in respect of each iteration of the first series of iterations.

5. A method for performing a division operation in a bit slice divider, comprising the steps of:

(a) operating a master divider to perform a first series of iterations on a master slice of a dividend to obtain a master slice partial remainder after each one iteration of the first series of iterations;

(b) storing a cumulative master slice partial remainder during the first series of iterations;

(c) operating a slave divider to perform a second series of iterations on a slave slice of the dividend to obtain a slave slice partial remainder after each one iteration of the second series of iterations;

(d) storing a cumulative slave slice partial remainder during the second series of iterations;

(e) operating said master divider to perform the first series of iterations independently of a result of a corresponding iteration of the second series of iterations;

(f) adding a most significant bit of the cumulative slave slice partial remainder to an LSB+2 bit of the cumulative master slice partial remainder during each iteration of the first series of iterations;

(g) adding a carry-in bit generated by the slave divider after each iteration of the second series of iterations to an LSB+3 bit of the master slice partial remainder after each iteration of the first series of iterations; and (h) monitoring said master divider to detect a preselected condition after each one iteration of the first series of iterations and inhibiting a subsequent iteration when said preselected condition is detected.

* * * * *